United States Patent
Snyder

(10) Patent No.: US 9,732,722 B1
(45) Date of Patent: Aug. 15, 2017

(54) METHODS AND SYSTEMS FOR CYLINDER SPEED INCREASE CONTROL TO IMPROVE COMBUSTION UNIFORMITY

(71) Applicant: Brunswick Corporation, Lake Forest, IL (US)

(72) Inventor: Matthew W. Snyder, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 124 days.

(21) Appl. No.: 14/640,924

(22) Filed: Mar. 6, 2015

(51) Int. Cl.
F02P 5/15 (2006.01)
F02D 41/14 (2006.01)
F02D 41/00 (2006.01)

(52) U.S. Cl.
CPC ........ *F02P 5/1512* (2013.01); *F02D 41/0085* (2013.01); *F02D 41/1497* (2013.01); *F02D 41/1498* (2013.01); *F02D 2041/1409* (2013.01); *F02D 2200/101* (2013.01); *F02D 2200/1012* (2013.01); *F02P 5/1502* (2013.01)

(58) Field of Classification Search
CPC .............. F02P 5/1512; F02D 41/0085; F02D 2200/101; F02D 2200/1012
See application file for complete search history.

(56) References Cited

U.S. PATENT DOCUMENTS

| | | | | |
|---|---|---|---|---|
| 4,561,397 A * | 12/1985 | Tsukamoto | ......... | F02D 41/0087 123/357 |
| 4,590,907 A * | 5/1986 | Tsukamoto | ......... | F02D 41/0085 123/357 |
| 4,688,535 A * | 8/1987 | Kuttner | ............... | F02D 41/1498 123/436 |
| 5,016,591 A * | 5/1991 | Nanyoshi | ............ | F02D 41/1498 123/406.2 |
| 5,701,865 A | 12/1997 | Thomas et al. | | |
| 6,109,986 A | 8/2000 | Gaynor et al. | | |
| 6,279,531 B1 * | 8/2001 | Robichaux | .......... | F02D 41/0087 123/339.19 |
| 6,325,056 B1 * | 12/2001 | Weining | ................ | F02D 41/008 123/443 |
| 6,755,176 B2 * | 6/2004 | Takeuchi | ............ | F02D 41/0085 123/299 |
| 6,755,179 B2 * | 6/2004 | Asakawa | ............ | F02D 41/0085 123/436 |
| 7,197,916 B2 * | 4/2007 | Matsumoto | ............ | G01M 15/11 73/114.04 |

(Continued)

OTHER PUBLICATIONS

Unpublished U.S. Appl. No. 14/489,075, filed Sep. 17, 2014.

*Primary Examiner* — Sizo Vilakazi
*Assistant Examiner* — Kevin R Steckbauer
(74) *Attorney, Agent, or Firm* — Andrus Intellectual Property Law LLP

(57) ABSTRACT

Systems and methods are for controlling internal combustion engines having a plurality of piston-cylinders that cause rotation of a crankshaft. A crankshaft sensor is configured to sense rotational speed of the crankshaft. A controller is configured to calculate an an engine speed increase for each piston-cylinder based upon the rotational speed of the crankshaft and then balance the engine speed increases of the respective piston-cylinders by modifying a combustion input to one or more of the piston-cylinders in order to reduce engine vibration.

16 Claims, 6 Drawing Sheets

(56) References Cited

U.S. PATENT DOCUMENTS

| | | | |
|---|---|---|---|
| 8,229,647 B2* | 7/2012 | Ichihara | F02D 41/0085 |
| | | | 701/102 |
| 2003/0131823 A1* | 7/2003 | Asakawa | F02D 41/0085 |
| | | | 123/436 |
| 2003/0164166 A1* | 9/2003 | Takeuchi | F02D 41/0085 |
| | | | 123/674 |
| 2005/0217356 A1* | 10/2005 | Matsumoto | G01M 15/11 |
| | | | 73/114.07 |
| 2009/0281713 A1* | 11/2009 | Jankovic | F01N 5/02 |
| | | | 701/111 |
| 2009/0292440 A1* | 11/2009 | Ichihara | F02D 41/0085 |
| | | | 701/102 |
| 2010/0212632 A1* | 8/2010 | Javaherian | F02D 35/02 |
| | | | 123/406.23 |
| 2014/0007856 A1* | 1/2014 | Tsuruoka | F02D 41/00 |
| | | | 123/704 |

\* cited by examiner

METHODS AND SYSTEMS FOR CYLINDER SPEED INCREASE CONTROL TO IMPROVE COMBUSTION UNIFORMITY

FIELD

The present disclosure relates to internal combustion engines and to control systems and methods for reducing vibrations in internal combustion engines, such as engines for propelling marine vessels.

BACKGROUND

A 4-stroke internal combustion engine typically comprises an intake valve for drawing an air/fuel mixture into a cylinder's combustion chamber and an exhaust valve for allowing combustion byproducts to escape from the chamber. A spark plug ignites the air/fuel mixture in a cylinder to move a piston, connecting rod, and crankshaft to provide power to the engine. These components are typically controlled by an engine control unit ("ECU"), which controls, among other things, the timing of fuel injection, the amount of fuel to be injected, and the timing of the spark. The spark time can be controlled to adjust the characteristics of combustion in a cylinder, and thus the force exerted on the piston, connecting rod, and crankshaft.

U.S. Pat. No. 6,109,986 discloses an idle speed control system for a marine propulsion system. The system controls an amount of fuel injected into the combustion chamber of an engine cylinder as a function of the error between a selected target speed and an actual speed. The speed can be engine speed measured in revolutions per minute or, alternatively, it can be boat speed measured in nautical miles per hour or kilometers per hour. By comparing target speed to actual speed, the control system selects an appropriate pulse width length for the injection of fuel into the combustion chamber and regulates the speed by increasing or decreasing the pulse width.

U.S. patent application Ser. No. 14/489,075 discloses systems and methods for controlling internal combustion engines having a plurality of piston-cylinders that cause rotation of a crankshaft. A crankshaft sensor is configured to sense rotational speed of the crankshaft, and a controller is configured to calculate an acceleration for each piston-cylinder based on the rotational speed of the crankshaft and then balance the accelerations of the respective piston-cylinders by modifying a combustion input to one or more of the piston-cylinders in order to reduce engine vibration.

U.S. Pat. No. 5,701,865 discloses a method of adjusting idle spark for an individual cylinder of an internal combustion engine in an automotive vehicle, including the steps of determining crankshaft acceleration for an individual cylinder of the internal combustion engine and determining an average acceleration error for the individual cylinder based on the determined crankshaft acceleration. The method also includes the steps of determining an adaptive spark advance for the individual cylinder based on the determined average acceleration error and determining a new spark advance for the individual cylinder based on the determined adaptive spark advance and a nominal spark advance. The method further includes the steps of adjusting idle spark for the individual cylinder based on the new spark advance for the individual cylinder.

The patents described above are hereby expressly incorporated by reference in the description of the present invention.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method for controlling spark timing in an internal combustion engine having a plurality of piston-cylinders that cause rotation of a crankshaft includes sensing a rotational speed of the crankshaft for an engine cycle. A speed increase of the crankshaft is then calculated for each piston-cylinder caused by a combustion event in that piston-cylinder. An average speed increase is then calculated as the average of the speed increases for the plurality of piston-cylinders. A spark time is then controlled for each piston-cylinder based on the difference between the speed increase for the respective piston-cylinder and average speed increase to cause a subsequent speed increase for each piston-cylinder to be closer to the average speed increase.

One embodiment of a system comprises an internal combustion engine having a plurality of piston-cylinders that cause rotation of a crankshaft and a crankshaft sensor that senses rotational speed of the crankshaft. The system further comprises a controller having a processor and a memory that calculates a speed increase of the crankshaft for each piston-cylinder caused by a combustion event in that piston-cylinder. The controller also calculates an average speed increase as the average of the speed increases for the plurality of piston-cylinders. The controller adjusts a spark time for each piston-cylinder based on the speed increase for the respective piston-cylinder and the average speed increase to cause a subsequent speed increase for each piston-cylinder to be closer to the average speed increase.

BRIEF DESCRIPTION OF THE DRAWINGS

Examples are described with reference to the following figures. The same numbers are used throughout the figures to reference like features and like components.

DETAILED DESCRIPTION OF THE DRAWINGS

Figure 1:
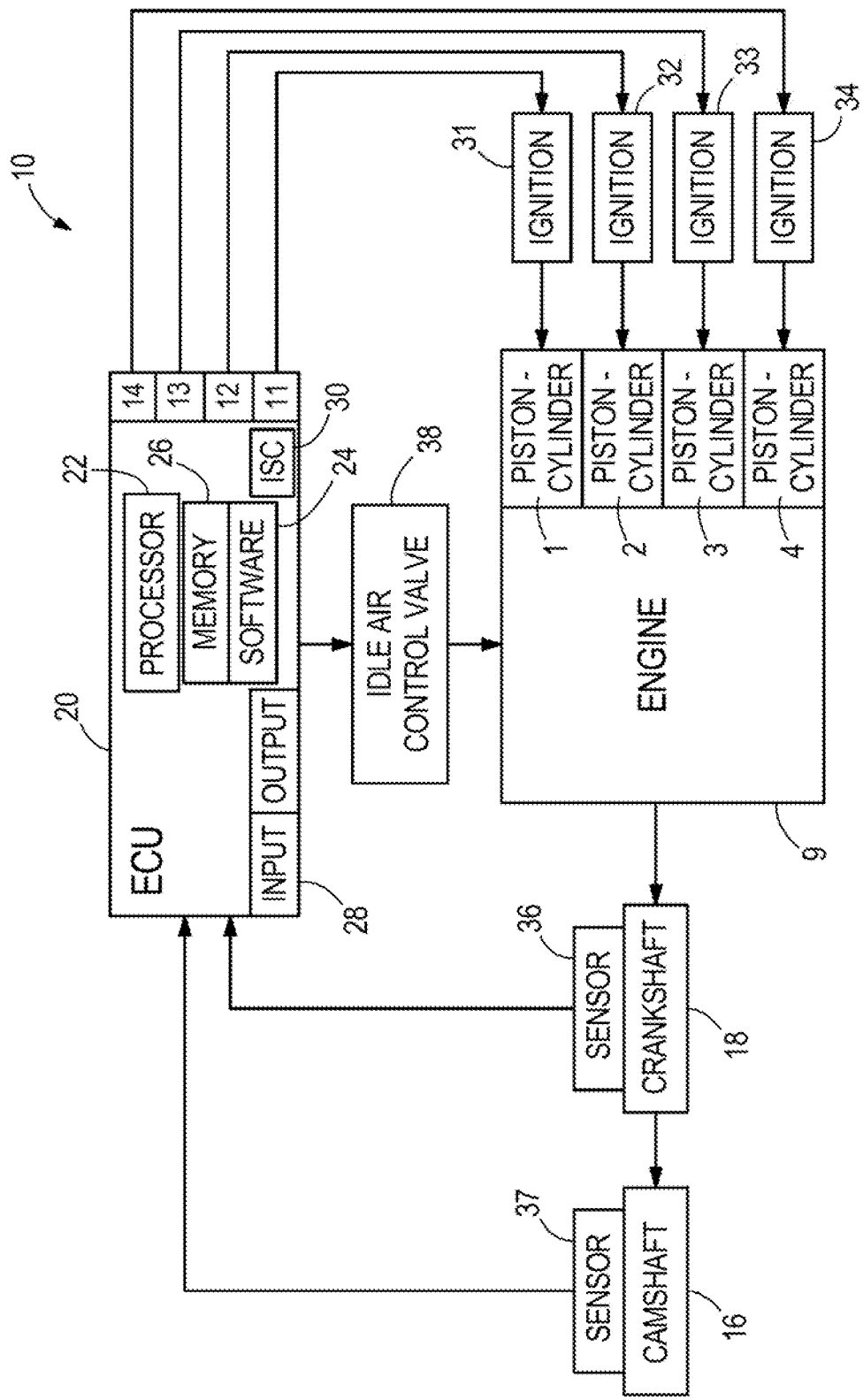
FIG. 1 is a schematic of a system according to the present disclosure.

FIG. 1 is a schematic showing a non-limiting example of a system 10 for controlling operations of an internal combustion engine 9. In this particular example, the engine 9 is a four-stroke engine having four piston-cylinders 1-4 that are arranged in an inline formation. However the type of stroke and number of piston-cylinders can vary from that which is shown. For example, the methods and systems disclosed herein may be utilized in engines having any number of cylinders, including two, six, twelve, etc., as will become clear to one of ordinary skill in the relevant art reviewing this disclosure. The arrangement of the piston-cylinders also can vary and in some examples can be arranged in a V-configuration or opposed-configuration instead of an inline configuration. As is conventional, reciprocation of the pistons in the cylinders causes rotation of a crankshaft 18, which in turn causes rotation of a camshaft 16. In situations where the engine 9 is configured for use in marine applications, rotation of the crankshaft 18 and camshaft 16 causes rotation of one or more propulsors (e.g. propellers, impellers, and/or the like) for causing movement of a marine vessel. Such arrangements are known in the art and examples are disclosed in U.S. Pat. Nos. 7,806,741; 7,354,324; 7,299,783; 6,571,753; 6,295,963; 6,109,986; and 5,950,588, which are incorporated herein by reference.

The system 10 includes an Engine Control Unit (ECU) 20 for controlling operations of the engine 9. The ECU 20 is a programmable controller that includes a computer processor 22, software 24, memory (i.e. computer storage) 26 and an input/output (interface) device 28. The processor 22 loads and executes the software 24 from the memory 26. When executed, software 24 controls the engine 9 to operate according to the functionality described in further detail below. In some examples, the processor 22 can comprise a microprocessor and related circuitry that retrieves and executes software 24 from memory 26. Processor 22 can be implemented within a single device but can alternately be distributed across multiple processing devices or sub-systems that cooperate in executing program instructions. Examples include general purpose central processing units, application specific processors, and logic devices, as well as any other type of processing device, combinations of processing devices, and/or variations thereof. Additional examples of suitable processors are disclosed in U.S. Pat. Nos. 7,941,253 and 6,273,771 which are incorporated herein by reference.

The ECU 20 includes an idle speed controller (ISC) 30, which can be a sub-system of the ECU 20 or a separate controller, distinct from the processor 22, software 24, memory 26 and input/output device 28 of the ECU 20. For discussion purposes herein below, the ISC 30 is a sub-system of the ECU 20; however it should be recognized that this is a non-limiting example and the particular configurations of the ECU 20 and ISC 30 can vary from that which is shown and described. The ISC 30 is configured to maintain the engine 9 at a certain idle speed, which in this disclosure is referred to as an "idle speed setpoint." The idle speed setpoint can be a calibrated engine speed value that typically is selected by the manufacturer through trial and error so as to avoid stalling of the engine 9 when it is operated at idle speed and when it is shifted into forward or reverse gear. Other methods of selecting the idle speed setpoint are known in the art. The ISC 30 is configured to control one or more "combustion inputs" to the piston-cylinders 1-4 to thereby maintain the speed of the engine 9 at the noted idle speed setpoint. Examples of "combustion inputs" can include timing of ignition (i.e. spark provided by spark plugs 31-34), quantity and/or rate of fuel provided to the engine, spark energy, spark duration, injection timing, quantity and/or rate of airflow provided to the engine 9 via an idle air control valve 38, and/or the like. In certain examples, the idle air control valve 38 can be an electronic valve located downstream of a main throttle body for the engine 9. The idle air control valve 38 typically is located in the intake air plenum for the engine 9. In certain examples, the ISC 30 can be a proportional integral derivative controller (PID), which calculates and monitors the rate of change of speed of rotation of the crankshaft 18 and how long the rate of change occurs. The ISC 30 is configured to compare the results of this calculation to one or more thresholds stored in the memory 26, and then modify the one or more of the noted combustion inputs accordingly to thereby maintain the engine 9 at the idle speed setpoint. It will be recognized by one having ordinary skill in the art that the type of ISC 30 can also vary from that which is shown and described. In another example, idle airflow to the engine may be controlled by the ECU via an electronically driven throttle. In this case, a separate idle air control valve is not needed.

The system 10 also includes a crankshaft sensor 36 that is configured to sense rotation and position of the crankshaft 18 and then provide electronic signals to the ECU 20 that represent the speed of rotation of the crankshaft 18 and the rotational position of the crankshaft 18. In certain examples, the camshaft sensor 38 can be a conventional encoder that is located on the crankshaft 18; however any conventional sensor that is configurable to sense speed of rotation and communicate this information to the ECU can be utilized. In other embodiments, the camshaft sensor 37 may be eliminated. In such embodiments, the system 10 may rely only on the crankshaft sensor 36 to determine the speed and position of the crankshaft 18.

Based upon the signals provided by the crankshaft sensor 36, the ISC 30 is configured to compare the actual idle speed of the engine 9 to the idle speed setpoint, which is stored in the memory 26. When the actual speed of the engine 9 deviates from the idle speed setpoint, the ISC 30 is configured to modify one or more of the noted combustion inputs to the piston-cylinders 1-4 to thereby maintain the engine 9 at the idle speed setpoint and/or respond to a need for a change in torque output of the engine 9. For example, the ISC 30 can be configured to change the rate or amount of airflow to the engine 9 by operating the idle air control valve 38. If a quicker response is necessary, the ISC 30 can be configured to control the timing of ignition via the spark plugs 31-34.

The above-described control systems and methods for controlling engine idle speed are implemented over relatively long periods of time (e.g. seconds) and are applied globally to the engine 9, that is, the above-mentioned systems and methods equally affect all of the piston-cylinders 1-4 of the engine 9. Through research and experimentation the present inventors have recognized that it is desirable to provide improved systems and methods that control the engine 9 on a piston-cylinder-to-piston-cylinder basis, and more specifically to separately control the ignition of each piston-cylinder provided by spark plugs 31-34, to thereby reduce inequality of output amongst the piston-cylinders 1-4 to reduce unwanted vibration of the engine 9. To that end, PID controllers 11-14 are provided, each designated to calculate a spark time of a piston-cylinder by the respective spark plug 31-34. In certain examples, the PID controllers 11-14 monitor the speed increase of the crankshaft 18 in connection with a designated one of the piston-cylinders and control the spark time for that piston-cylinder accordingly. For discussion purposes herein below, the PID controllers 11-14 are a sub-system of the ECU 20; however it should be recognized that this is a non-limiting example and the particular configurations of the ECU 20 and PID controllers 11-14 can vary from that which is shown and described.

According to the present disclosure, the ECU 20 is uniquely configured to calculate a rotational speed increase of each individual piston-cylinder 1-4 based upon the rotational speed of the crankshaft 18, then calculate an average speed increase for the piston-cylinders 1-4, and thereafter to cause the speed increases of the individual piston-cylinders 1-4 to converge towards the average speed increase of all of the piston-cylinders. As explained further herein, the ECU 20 is uniquely configured to calculate the speed increase of each piston-cylinder 1-4 during each of a plurality of engine cycles N, each engine cycle N consisting of one combustion event per piston-cylinder 1-4. Typically, the speed increase of the crankshaft is measured in revolutions per minute (RPM).

As discussed above, the crankshaft sensor 36 senses the speed of rotation of the crankshaft 18 and provides this information to the ECU 20. In one example, the crankshaft sensor 36 is a rotary encoder that provides information about the angular position of the crankshaft 18, which is then used to determine a rotational speed of the crankshaft 18. The rotational speed of the crankshaft 18 is sensed in this way over the course of an engine cycle. Thereby, the contribution of each piston-cylinder 1-4 to the rotation of the crankshaft 18 can be measured, such as by calculating a speed increase of the crankshaft 18 associated with a combustion event in each piston-cylinder 1-4. Optionally, the ECU 20 can also be configured to filter the speed increase to thereby obtain a filtered speed increase of the crankshaft 18 associated with each combustion event in each piston-cylinder. In certain examples, the filtering step can include filtering the speed increase for each piston-cylinder 1-4 with a first order filter so as to dampen abrupt changes in the speed increase values and to smooth the speed increase values over time such that the system 10 is less reactive to instantaneous changes in speed increase in the various piston-cylinders 1-4. However, a filtering step is not required and such smoothing effects may be accomplished via adjustment of the integral term of the PID controller, as will be made clear in the description herein below.

The speed increases for each piston-cylinder are then averaged to calculate an averaged speed increase for all of the piston-cylinders 1-4. The ECU is then configured to calculate a spark time offset, or adjustment, for each piston-cylinder in order to cause the subsequent speed increase in that piston-cylinder for the subsequent engine cycle to be closer to the average speed increase. Calculation of the spark time offset for each piston-cylinder may account for a correction factor such that no net timing offset is applied across the plurality of cylinders—i.e., the sum of the spark time offsets for all of the piston-cylinders 1-4 is approximately zero. The correction factor may be calculated based on previous spark time offsets, such as from the previous engine cycle. For example, the correction factor may be an average of the spark time offsets for the most recent engine cycle.

By causing the speed increases of the piston-cylinders 1-4 to converge on the average speed increase, some of the piston-cylinders 1-4 are forced to advance their timing and others to retard their timing. Accordingly, the disclosed system 10 and method 50 requires smaller control outputs to control the desired value and minimizes the changes from the calibrated spark timings. Moreover, since a correction factor is applied to cause the sum of the spark timing offsets to be approximately zero, the timing is advanced in some cylinders and retarded in others and no net torque increase or decrease is realized. Another feature of the present method 50 and system 10 is that control can be accomplished using only fixed point math, which limits the amount of processing power and time utilized to implement controls. For example, in comparison to control methods employing crankshaft acceleration as a control variable, calculation of the speed increase does not need to account the time or crank angle difference between the minimum and maximum speed values. Accordingly, the system and method therein may be accomplished using a production ECU and common control blocks available in engine controllers, such as PIDs and first order filters. In addition, since minimal data needs to be kept between engine cycles, resource usage is kept to a minimum, as is the processing time. Another feature of the control system 10 and method 50 is that it works in concert with existing idle speed controls. This method of reducing a quality of output amongst the piston-cylinders 1-4 is designed to run significantly slower than the ISC 30, and the system associated therewith, in order to prevent interaction between the two control systems. In one embodiment, the presently disclosed method and system for controlling speed increase is about ten times slower than the responsiveness of the control by the idle speed controller 39 of the idle air control valve 28.

Figure 2:
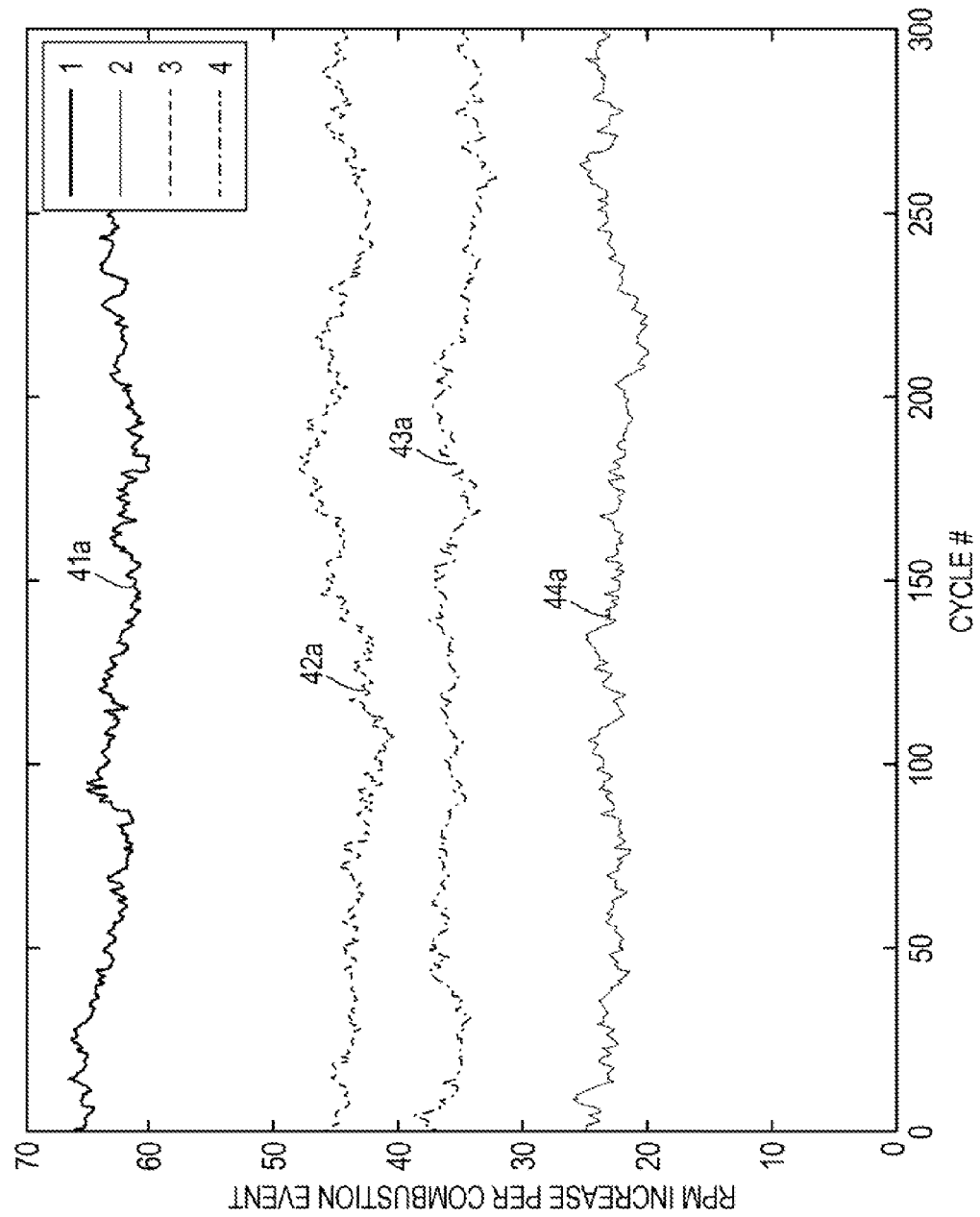
FIG. 2 is a graph depicting rotational speed increases in a plurality of piston-cylinders of an internal combustion engine over a number of engine cycles without the systems described in the present disclosure.
Figure 3:
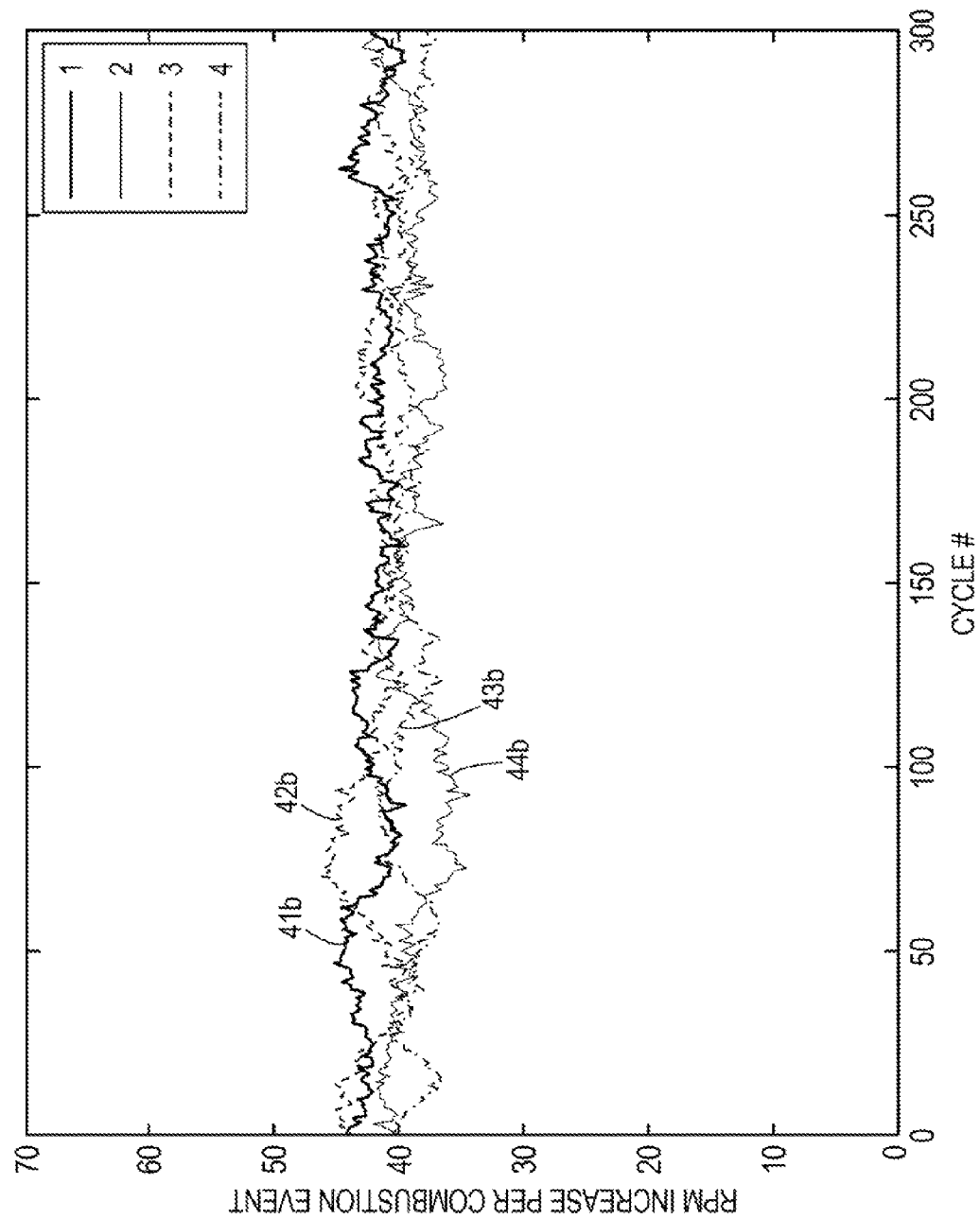
FIG. 3 is a graph depicting rpm increases in a plurality of piston-cylinders of an internal combustion engine over a number of engine cycle employing the systems and methods described herein.

The graphs at FIGS. 2 and 3 depict exemplary results of the present method and system for controlling cylinder speed increase. FIG. 2 depicts the speed increases 41a-44a of the piston-cylinders over several hundred engine cycles without application of the presently disclosed control system 10 and method 50. As depicted in the graph, the speed increase 41a associated with the first piston-cylinder 1 is the highest and the speed increase 44a for the fourth piston-cylinder 4 is the lowest, with the speed increase 42a associated with piston-cylinder 2 and speed increase 43a associated with piston-cylinder 3 falling therebetween. FIG. 3 exemplifies speed increases 41b-44b of the crankshaft associated with combustion events in piston-cylinders 1-4 after the application of the system and method for controlling speed increase. As exemplified in the graph of FIG. 3, the speed increases 41b-44b are more equivalent to one another and are closer to the average of the speed increases 41a-44a before application of the control system and method depicted in FIG. 2.

Figure 5:
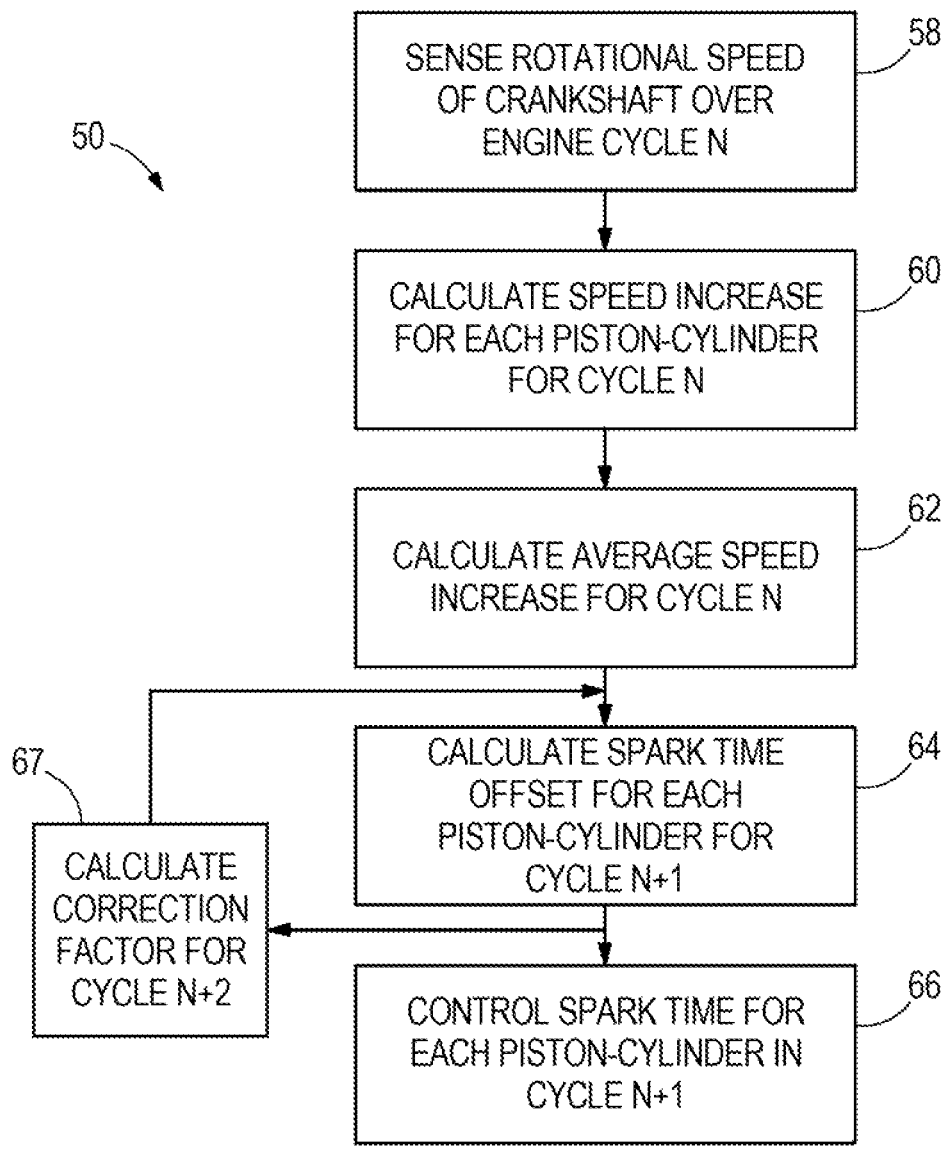
FIG. 5 is a flow chart depicting one exemplary method according to the present disclosure.

FIG. 5 depicts one example of a method 50 according to the present disclosure. At step 58, the rotational speed of the crankshaft is sensed throughout an engine cycle N. For example, one engine cycle may equal 720° of rotation of the crankshaft, as is typical in four stroke engines. A speed increase is then calculated at step 50 for each piston-cylinder for that cycle. The speed increase is calculated based on the rotational speed of the crankshaft associated with a combustion event in a respective piston-cylinder. For example, the speed increase for each piston-cylinder 1-4 may be a difference between a minimum rotational speed and a maximum rotational speed of the crankshaft associated with a combustion event and the respective piston-cylinder 1-4. An average speed increase is then calculated for that engine cycle at step 62. More specifically, the average speed increase may be the sum of the speed increases for the piston-cylinders 1-4 divided by 4 (the number of piston-cylinders). A spark time offset is then calculated for each piston-cylinder at step 64. The spark time offset for the next engine cycle N+1 is calculated based on the average speed increase for cycle N and the speed increase for the effective piston-cylinder for cycle N. The spark time offset calculation for cycle N+1 also accounts for the correction factor calculated based on the offsets calculated for cycle N. The spark time for each piston-cylinder is then controlled in cycle N+1 at step 66 based on the spark time offset calculated for that piston-cylinder at step 64.

Simultaneously or subsequently, the correction factor is calculated at step 67 to be applied to a subsequent spark time offset calculation at the next execution of step 64, which would be the spark time offset calculated for engine cycle N+2. The purpose of the correction factor is to cause the sum of the spark time offsets for the plurality of piston-cylinders to be approximately zero so that no net torque increase or decrease is applied to the crankshaft 18 over one engine cycle. In one embodiment, the correction factor may be an average of previous spark time offsets for the piston-cylinders 1-4 from the previous engine cycle. The correction factor may be used to adjust an error accumulation value for each of the piston-cylinders 1-4, such as by subtracting the correction factor from an integral term calculated by a PID controller 11-14 for each piston-cylinder 1-4. In context of the method 50 illustrated at FIG. 5, the spark time offset for each piston-cylinder calculated at step 64 for engine cycle N+1 would be the average of the spark time offsets for the piston-cylinders 1-4 applied in cycle N.

Figure 6:
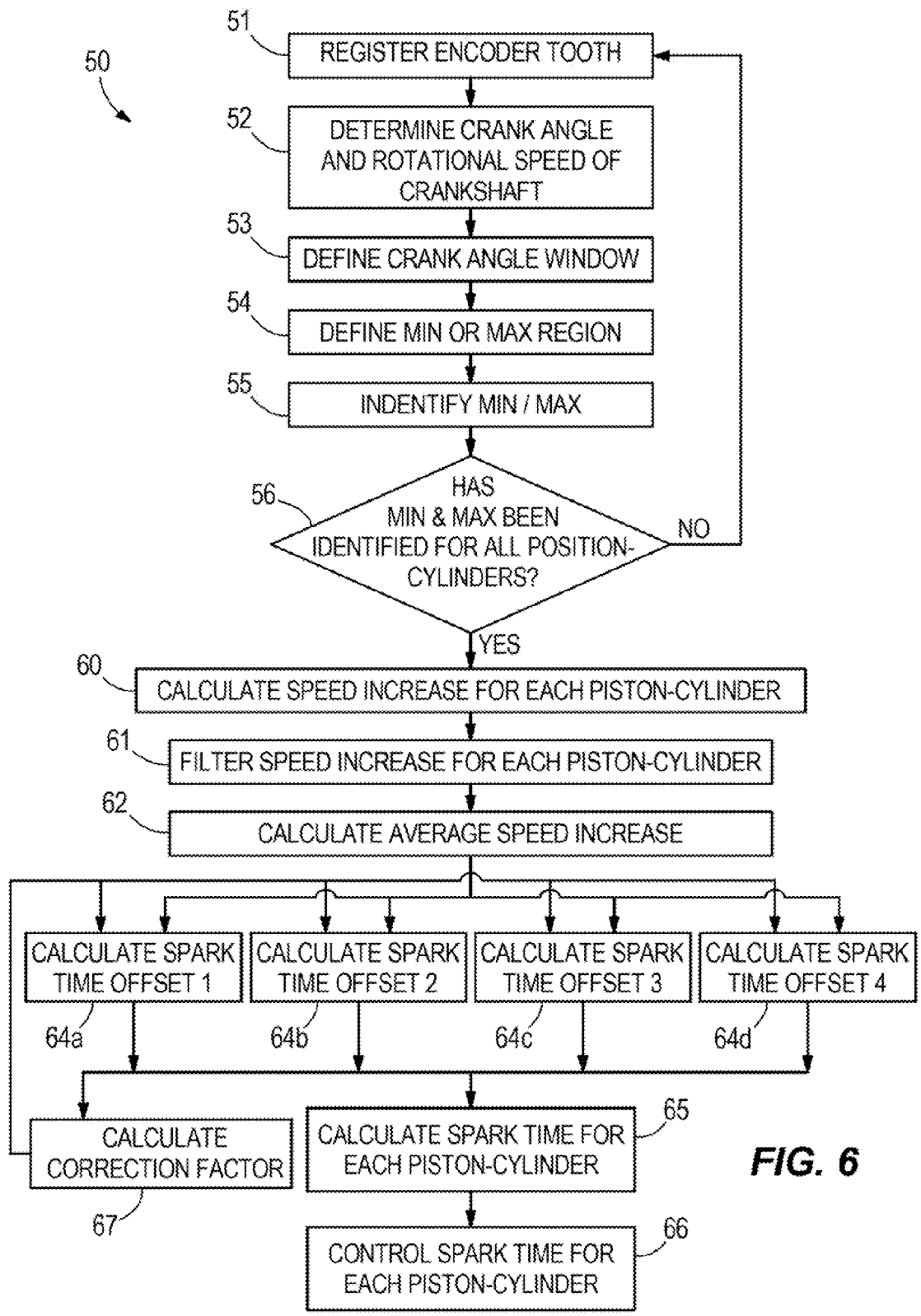
FIG. 6 is a flow chart depicting another exemplary method according to the present disclosure.

FIG. 6 depicts another embodiment of a method 50 of controlling cylinder speed increase. At step 51, a rotary encoder having teeth providing trigger points at defined locations around the circumference, such as a Hall Effect gear tooth sensor, may be employed. The encoder may be fixed to the crankshaft 18 such that the rotation of the crankshaft 18 is sensed by detecting the passing of each tooth on the encoder. At step 52, a crank angle and a rotational speed of the crankshaft are determined based on the detected rotational speed and rotational position of the encoder. Since the circumference and configuration of the encoder is known, the rotational speed of the crankshaft 18 can be determined based on the rate at which the encoder teeth are detected.

In examples of the presently disclosed systems that include the camshaft sensor 37, the speed increase associated with each piston-cylinder can be determined by associating the position of the crankshaft sensor 36 with that of the camshaft sensor 37. For example, the ECU 20 may employ calculations based on the fact that the crankshaft 18 rotates twice per engine cycle and the camshaft 16 rotates only once per engine cycle. The firing order of the piston-cylinders 1-4 is also a known value. In the example of FIG. 1, which has four piston-cylinders 1-4, this basis can allow the ECU 20 to be configured to distinguish between piston-cylinder 1 and piston-cylinder 4, for example where both pistons 1 and 4 reach top-dead center at the same time. The ECU 20 can be programmed to compare the position of the crankshaft 18 and the camshaft 16 to thereby identify which one is on the top-dead-center power stroke and which is on the top-dead-center exhaust stroke. With this knowledge, the ECU 20 can then identify which piston-cylinder 1-4 is associated with each speed increase.

In examples that do not include the camshaft sensor 37, the ECU 20 can control the spark time for each piston-cylinder individually base on the firing order, or order of combustion events of the piston-cylinders 1-4, and the position of the crankshaft 18. Where an engine cycle involves 720 degrees rotation of the crankshaft 18, the ECU 20 also knows which piston-cylinders fire together, or are paired, in a 360 degree rotation of the crankshaft 18. In such embodiments, the ECU 20 will not know which piston-cylinder is which; however, the ECU will be able to calculate and adjust the spark times for each of the cylinders based the rotational speed measured from the crankshaft sensor in conjunction with the known firing order and the measured position of the crankshaft 18. Through experimentation and research, the present inventors have recognized that the spark times for each of the piston-cylinders may be individually controlled without requiring that the ECU know the actual engine phase.

Figure 4:
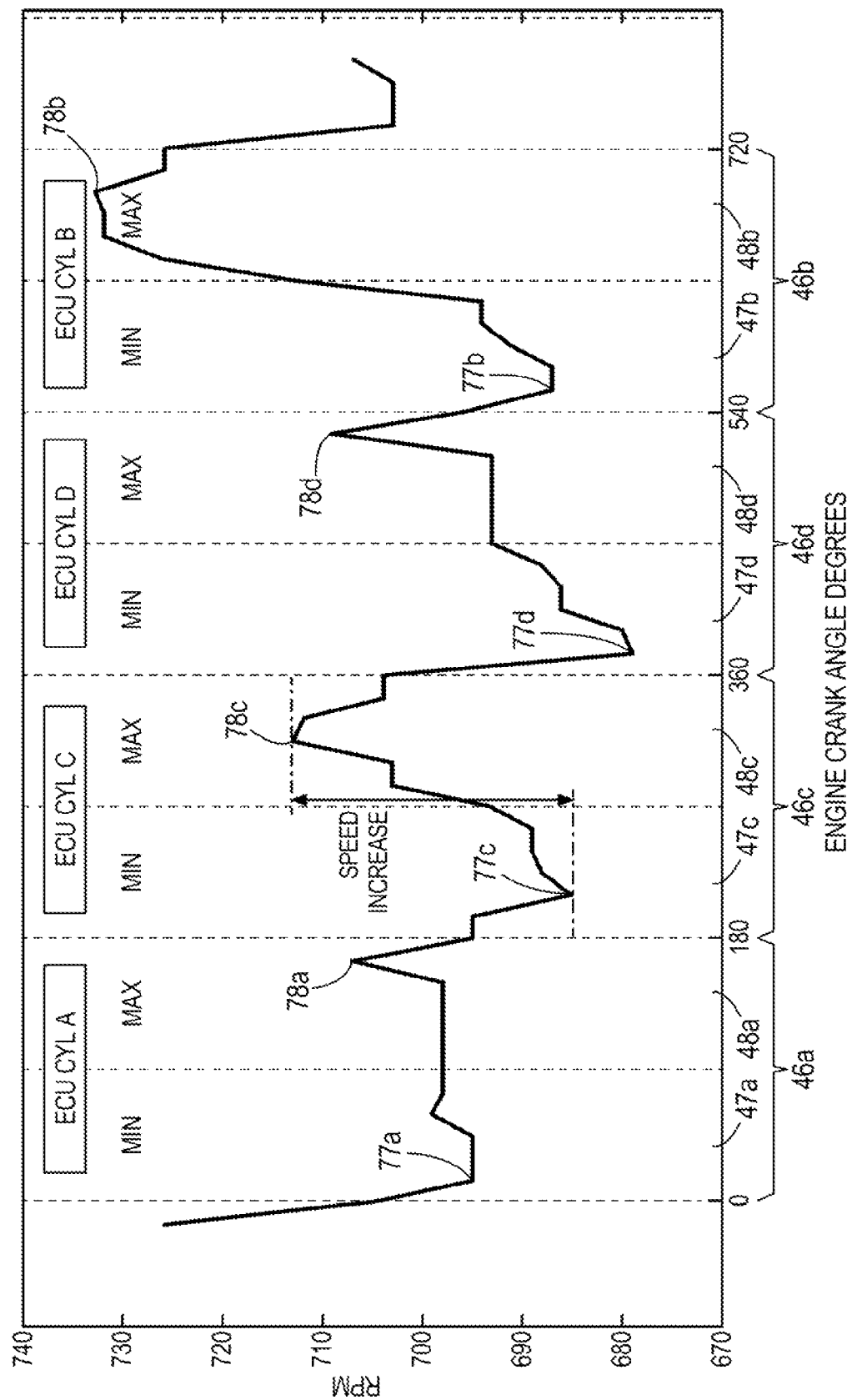
FIG. 4 is a graph depicting an exemplary rotational speed of a crankshaft of an internal combustion engine during one engine cycle.

In one embodiment, the ECU 20 defines a crank angle window 46a-46d for each piston-cylinder A-D based on the combustion event order and the position of the crankshaft 18, which are known to the ECU 20. As described above, the ECU 20 may or may not know which ECU cylinder A-D corresponds with which physical cylinder 1-4. In an embodiment where the ECU 20 only receives input from sensor 36 on crankshaft 18, and not from sensor 37 on camshaft 16, the ECU may not correctly associate the speed increases with the correct physical piston-cylinder 1-4 causing each speed increase; however, such information is not necessary for the purposes of the control system 10 and method 50. FIG. 4 depicts an exemplary scenario for a four stroke engine having four piston-cylinders. The combustion event order known to the ECU 20 is the following: piston-cylinders 1, 3, 4, 2, where 1 and 3 are paired and 2 and 4 are paired in each 360 degree rotation of the crankshaft. For each engine cycle detected, the ECU 20 defines crank angle windows 46a-46d for each ECU cylinder A-D, which is a portion of the rotation of the crankshaft associated with a combustion event in that ECU cylinder A-D. The crank angle windows 46a-46d for each ECU cylinder A-D are assigned based on the known firing order as: ECU Cylinder A 0° to 180°, ECU Cylinder C 180° to 360°, ECU Cylinder D 360° to 540°, ECU Cylinder B 540° to 720°.

The spark times for each of the ECU cylinder A-D are then controlled based on the angle range of their firing, and the proper spark time adjustments are made to each individual piston-cylinder. The speed increase value is determinable by detecting a minimum rotational speed 77 and a maximum rotational speed 78 within each crank angle window 46a-d. For example, the speed increase for the ECU cylinder C associated with the crank angle window 46c may be calculated as the maximum rotational speed 78c measured in that window minus the minimum rotational speed 77c measured in that window. Likewise, the speed increase for the cylinder associated with crank angle window 46a would be the rotational speed maximum 78a minus the rotational speed minimum 77a, and so on. In one embodiment, the processing power required to execute the method may be reduced by defining a minimum window 47a-d and a maximum window 48a-d within each crank angle window 46a-d. Then the ECU 20 may identify a minimum rotational speed 77a-d of the crankshaft within each minimum window 47a-d and a maximum rotational speed of 78a-d the crankshaft within each maximum window 48a-d.

A crank angle window is defined at step 53 for each piston-cylinder in the engine 9. As described above and exemplified in FIG. 4, the ECU 20 may also define a minimum window 47a-d or a maximum window 48a-d within each crank angle window 46a-d at step 54, and then identify a minimum rotational speed 77a-d or a maximum rotational speed 78a-d within each window at step 55. At step 56, the ECU 20 determines whether a minimum rotational speed 77a-77d and a maximum rotational speed 78a-78d have been identified for all piston-cylinders. If not, the ECU returns to step 51. Otherwise, the ECU 20 continues to step 60. In another embodiment, at step 56 the ECU may instead determine whether a full engine cycle has occurred, such as whether the crankshaft 18 has turned 720 degrees. At step 60, a speed increase is calculated for each piston-cylinder, such as by subtracting each minimum rotational speed 77a-77d from the respective maximum rotational speed 78a-78d.

Optionally, at step 61 the speed increase calculated for each ECU cylinder A-D may be filtered. For example, a first order filter may be applied to filter each speed increase value. In such an embodiment, the filtered speed increase value would be calculated as follows:

$$y_n = x_n * (FilterConst) + y_n - 1 * (1 - FilterConst)$$

where $x_n$ equals the speed increase calculated for the current engine cycle N, $y_n-1$ equals the filtered speed increase from the previous engine cycle, and FilterConst equals a number between 0 and 1 that determines how fast the filter responds to its input. A FilterConst of 0 would result in an infinitely slow filter having an output unaffected by its input and a FilterConst of 1 would result in no filtering where the output is equal to the input. The lower the FilterConst, the slower the filter. One object of the method 10 and system 50 may be to provide a control that runs much slower than the idle air controller to prevent interaction with the idle controls, in some embodiments it may be beneficial to provide a first order filter with a relatively low filter constant, such as 0.1 or less. In one exemplary embodiment tested by the inventors, the speed increase values for each piston-cylinder were filtered using a first order filter having a filter constant of 0.0763. However, other filter constants of higher or lower value may be equally employed.

The average speed increase is calculated at step 62. In embodiments where the speed increase for each ECU cylinder A-D is filtered, the average speed increase is calculated as the average of the filtered speed increases. In embodiments where no filter is employed, the average speed increase may be calculated based on the speed increases for each ECU cylinder A-D calculated at step 60. At step 64, a spark time offset is calculated for each ECU cylinder A-D based on the average speed increase calculated at step 62 and the speed increase for each piston-cylinder calculated at step 60. Specifically, at step 64a, the spark time offset is calculated for ECU cylinder A, which would be the piston-cylinder having a combustion event in the crank angle window 46a. Likewise, a spark time offset is calculated at steps 64b-64d for each of the remaining ECU cylinders B-D based on the data gathered in the associated crank angle windows 46b-46d. Additionally, each spark time offset may be calculated at steps 64a-64d to account for the correction factor determined at step 67. Finally, a spark time is calculated for the piston-cylinder at step 65, and that spark time for each piston-cylinder is applied at step 66.

In one embodiment, steps 64a-64d are carried out by four separate PID controllers 11-14. Each PID controller 11-14 may use its integral term to calculate the spark time offset for a respective piston-cylinder using the average speed increase as a setpoint and the speed increase (or filtered speed increase, if applicable) as feedback. The following set of equations describe the function of the PID controller 11-14 in calculating the spark time offset for a respective ECU cylinder A-D:

$$Setpoint = (SpeedIncr_a + Speed\ Incr_b + SpeedIncr_c + SpeedIncr_d)/4$$

$$Iterm_x = PreviousIterm_x + (Setpoint - SpeedIncr_x) * Igain - CorrectionFactor\ PID\_Output_x = Iterm_x$$

wherein x represents each of the ECU cylinders A-D, $Iterm_x$ is the integral term for each PID controller, $PreviousIterm_x$ is the Iterm calculated for that piston-cylinder by the PID controller for the previous engine cycle, Igain is the integral gain set for the PID controller, and $PID\_Output_x$ is the output of each PID controller 11-14 associated with a respective ECU cylinder A-D.

In the described exemplary embodiment, the proportional term (Pterm) and the derivative term (Dterm) for each PID controller 11-14 is set to zero such that the output of each PID controller ($PID\_Output_x$) is equal to the integral term calculated by that PID controller. In other words, the gain for the Pterm and the Dterm are zero. In embodiments where the Pterm and the Dterm of each PLD controller 11-14 are set to zero, the spark time offset is equal to the Iterm of the PID controller. However, it should be understood that in other embodiments the gains for the Pterm and/or the Dterm may not be set to zero, and thus the output of the PID controller determining the spark time offset for the respective piston-cylinder may differ from the Iterm.

The outputs of the PID controllers 11-14 are calculated and applied as spark time offsets for each ECU cylinder A-D. Those values are also used to calculate the correction factor. As described above, the correction factor may be calculated at step 67 as an average of the spark time offsets the ECU cylinders A-D. The general equation for the correction factor may be presented as:

$$CorrectionFactor = (PID\_Output_a + PID\_Output_b + PID\_Output_c + PID\_Output_d)/4$$

At step 65, a spark time for each piston-cylinder is calculated by the ECU 20 based on the spark time offset calculated for the respective piston-cylinder at step 64a-64d. In keeping with the exemplary equations presented above, the spark time for each ECU cylinder A-D may be presented as:

$$Spk\_Time_x = Base\_Spk\_Time + Idle\_Ctrl\_Time\_Offset = PID\_Output_x$$

where the Base_Spk_Time is a table lookup based on engine speed and load calibrated for good run quality and emissions and the idle_Ctrl_Time_Offset equals the offset determined by the idle speed controller 30. The spark time offset, and thus the output of the respective PID controller 11-14, may be a positive or negative number depending on whether the spark time is advanced or retarded. As described above, the goal of the correction factor is to ensure that no net timing offset is applied across the plurality of piston-cylinders. As an explanatory example, if the output values of the PID controllers 11-14 are [1, 5, −1, −2], the overall result will be an advancement of timing (1+5+−1+−2=3). The correction factor in this scenario would be 0.75. This correction factor would be applied to calculate the spark time offset for the subsequent engine cycle. In accordance with the equations above, the correction factor of 0.75 would subtracted from the subsequent Iterms such that the Iterms would start at [0.25, 4.25, −1.75, −2.75], which has a sum of zero.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A method for controlling an internal combustion engine having a plurality of cylinders containing pistons that cause rotation of a crank shaft, the method comprising:
sensing a rotational speed of the crankshaft for an engine cycle;
calculating a speed increase of the crankshaft for each of the plurality of cylinders caused by a combustion event in that cylinder;
calculating an average speed increase as the average of the speed increases for the plurality of cylinders; and
controlling a spark time for each of the plurality of cylinders based on a difference between the speed increase for the respective cylinder and the average speed increase to cause a subsequent speed increase for each of the plurality of cylinders to be closer to the average speed increase;
wherein controlling the spark time for each of the plurality of cylinders includes calculating a spark time offset for each of the plurality of cylinders, by configuring a proportional-integral-derivative (PID) controller for each of the plurality of cylinders to calculate the spark time offset for the respective cylinder using the average speed increase as a setpoint and the speed increase for the respective cylinder as feedback.

2. The method of claim 1 further comprising subtracting a correction factor from an integral term of each PID controller, wherein the correction factor is calculated based on previous spark time offsets from a previous engine cycle.

3. The method of claim 2 wherein the correction factor is an average of the previous spark time offsets from the previous engine cycle for the plurality of cylinders.

4. The method of claim 2 wherein a proportional term and a derivative term for each PID controller are zero and the output of the PID controller is the integral term.

5. The method of claim 1 further comprising filtering the speed increase for each of the plurality of cylinders, and then calculating the average speed increase as an average of the filtered speed increases for the plurality of cylinders and controlling the spark time for each of the plurality of cylinders based on the filtered speed increase for that cylinder.

6. The method of claim 1 wherein the speed increase for each of the plurality of cylinders is a difference between a minimum rotational speed and a maximum rotational speed of the crankshaft associated with the combustion event in that cylinder.

7. The method of claim 1 further comprising determining a crank angle, defining a crank angle window for each of the plurality of cylinders based on the crank angle, wherein each crank angle window is a portion of the rotation of the crankshaft associated with the combustion event in the respective cylinder, and identifying a minimum rotational speed and a maximum rotational speed of the crankshaft within each crank angle window, wherein the speed increase for each of the plurality of cylinders is a difference between the minimum rotational speed and the maximum rotational speed in the respective crank angle window.

8. The method of claim 7 further comprising defining a minimum window and a maximum window within each crank angle window and identifying the minimum rotational speed of the crankshaft within the minimum window and the maximum rotational speed of the crankshaft within the maximum window.

9. The method of claim 1, wherein an engine cycle equals 720° of rotation of the crankshaft.

10. A system comprising:
an internal combustion engine having a plurality of cylinders containing pistons that cause rotation of a crankshaft;
a crankshaft sensor that senses a rotational speed of the crankshaft;
a controller configured to:
calculate a speed increase of the crankshaft for each of the plurality of cylinders caused by a combustion event in that cylinder;
calculate an average speed increase as the average of the speed increases for the plurality of cylinders;
adjusts a spark time for each of the plurality of cylinders based on the speed increase for the respective cylinder and the average speed increase to cause a subsequent speed increase for each of the plurality of cylinders to be closer to the average speed increase;
a proportional-integral-derivative (PID) controller for each of the plurality of cylinders configured to calculate the spark time offset for the respective cylinder using the average speed increase as a setpoint and the speed increase for the respective cylinder as feedback.

11. The system of claim 10 wherein the controller is further configured to adjusts the spark time for each of the plurality of cylinders such that no net timing offset is applied across the plurality of cylinders.

12. The system of claim 10 wherein each PID controller is further configured to subtracts a correction factor from its integral term, wherein the correction factor is an average of spark time offsets from a previous engine cycle.

13. The system of claim 10 wherein the speed increase for each of the plurality of cylinders is a difference between a minimum rotational speed and a maximum rotational speed of the crankshaft associated with the combustion event in that cylinder.

14. The system of claim 10 wherein the controller is further configured to determine a crank angle, and wherein the controller identifies which cylinder is associated with each speed increase based on the crank angle.

15. The system of claim 14 wherein the controller is further configured to defines a crank angle window for each of the plurality of cylinders, wherein each crank angle window is a portion of the 720° rotation of the crankshaft associated with the combustion event in the respective cylinder, and identify a minimum rotational speed and a maximum rotational speed of the crankshaft within each crank angle window, wherein the speed increase for each of the plurality of cylinders is a difference between the minimum rotational speed and the maximum rotational speed in the respective crank angle window.

16. A system for controlling spark timing in an internal combustion engine having at least a first cylinder containing a first piston and a second cylinder containing a second piston that cause rotation of a crank shaft, the system comprising:
a crankshaft sensor that senses a rotational speed and a crank angle of the crankshaft;
a controller configured to:
calculate a first speed increase of the crankshaft for the first cylinder and a second speed increase of the crankshaft for the second cylinder based on the rotational speed and the crank angle; and
average at least the first speed increase and the second speed increase to calculate an average speed increase; and
control a spark time for the first cylinder and the second cylinder;

a first PID controller configured to calculate a first spark time offset for the first cylinder using the average speed increase as a setpoint and the first speed increase as feedback;

a second PID controller configured to calculate a second spark time offset for the second cylinder using the average speed increase as a setpoint and the second speed increase as feedback;

wherein the controller is configured to control the spark time for the first cylinder based on the first spark time offset and control the spark time for the second cylinder based on the second spark time offset to cause a subsequent first speed increase and a subsequent second speed increase to be closer to the average speed increase and such that no net timing offset is applied across the plurality of cylinders.

* * * * *

UNITED STATES PATENT AND TRADEMARK OFFICE
CERTIFICATE OF CORRECTION

PATENT NO. : 9,732,722 B1  
APPLICATION NO. : 14/640924  
DATED : August 15, 2017  
INVENTOR(S) : Matthew W. Snyder Page 1 of 1

It is certified that error appears in the above-identified patent and that said Letters Patent is hereby corrected as shown below:

In the Claims

In Claim 10, at Column 12, Line 13: "adjusts" should instead read --adjust--.

In Claim 11, at Column 12, Line 24: "adjusts" should instead read --adjust--.

In Claim 12, at Column 12, Line 28: "subtracts" should instead read --subtract--.

In Claim 15, at Column 12, Line 41: "defines" should instead read --define--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*